No. 642,342. Patented Jan. 30, 1900.
A. LEVEDAHL.
ROLLER BEARING.
(Application filed Apr. 21, 1899.)
(No Model.) 3 Sheets—Sheet 1.

Witnesses:
Carl H. Crawford
C. W. Hill

Inventor:
Axel Levedahl
by Poole & Brown his Attys

No. 642,342. Patented Jan. 30, 1900.
A. LEVEDAHL.
ROLLER BEARING.
(Application filed Apr. 21, 1899.)
(No Model.) 3 Sheets—Sheet 2.
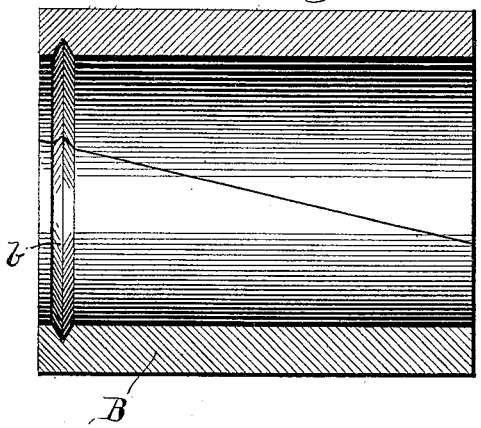
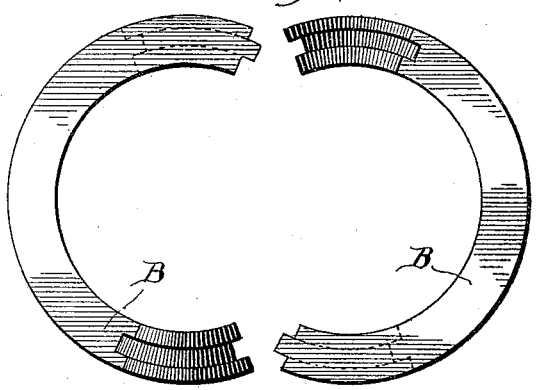
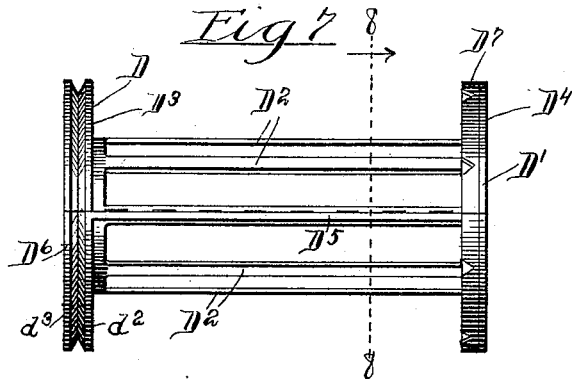
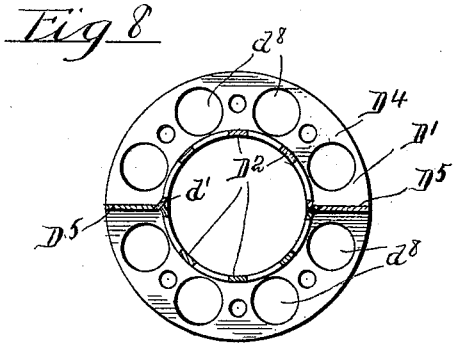
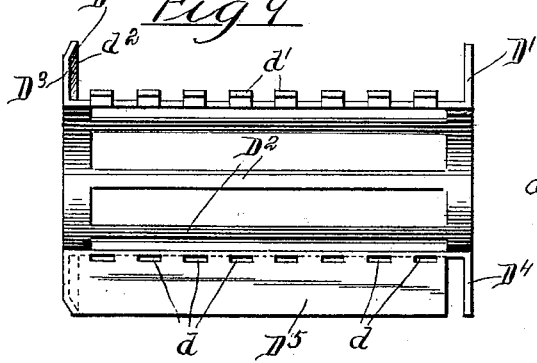
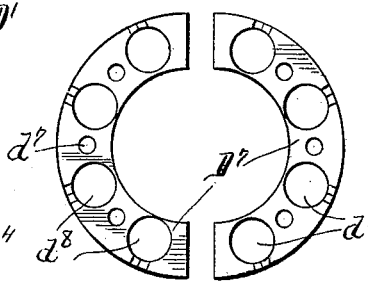
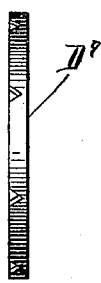
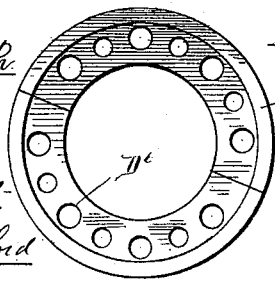
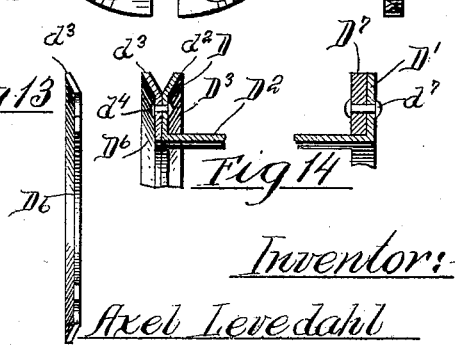
Witnesses:
Carl H. Crawford
C. W. Hills
Inventor:
Axel Levedahl
by Poole & Brown his Attys
THE NORRIS PETERS CO., PHOTO-LITHO., WASHINGTON, D. C.

No. 642,342. Patented Jan. 30, 1900.
A. LEVEDAHL.
ROLLER BEARING.
(Application filed Apr. 21, 1899.)
(No Model.) 3 Sheets—Sheet 3.
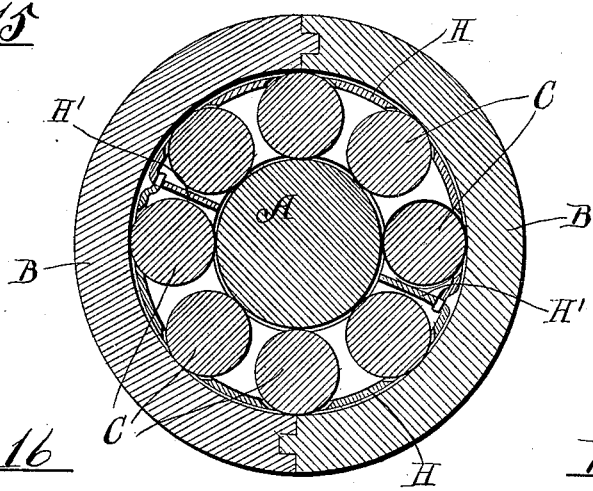
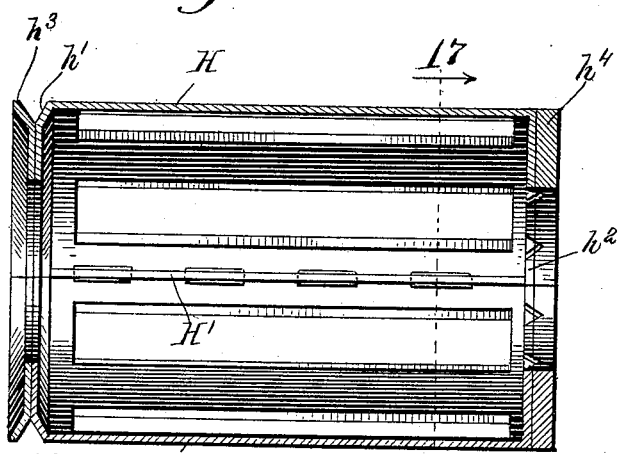
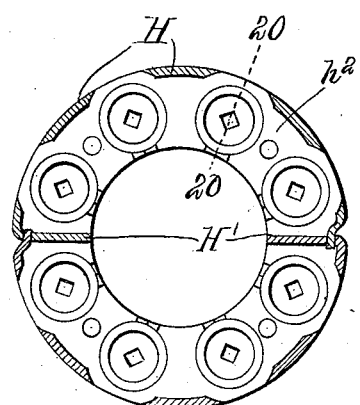
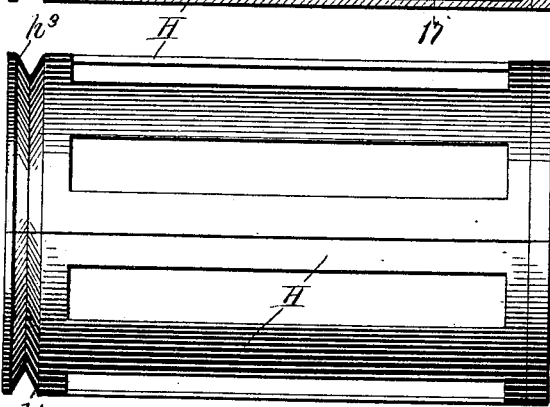
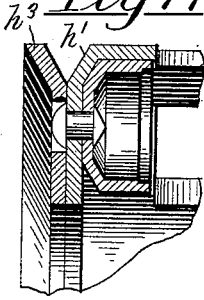
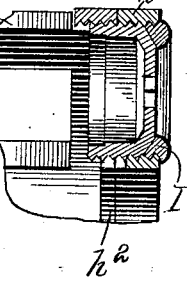
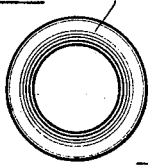
Witnesses:
Carl H. Crawford
Inventor:
Axel Levedahl
by Poole & Brown, his Atty.

UNITED STATES PATENT OFFICE.

AXEL LEVEDAHL, OF AURORA, ILLINOIS, ASSIGNOR TO THE AURORA AUTOMATIC MACHINERY COMPANY, OF SAME PLACE.

ROLLER-BEARING.

SPECIFICATION forming part of Letters Patent No. 642,342, dated January 30, 1900.

Application filed April 21, 1899. Serial No. 713,947. (No model.)

*To all whom it may concern:*

Be it known that I, AXEL LEVEDAHL, of Aurora, in the county of Kane and State of Illinois, have invented certain new and useful Improvements in Roller-Bearings; and I do hereby declare that the following is a full, clear, and exact description thereof, reference being had to the accompanying drawings, and to the letters of reference marked thereon, which form a part of this specification.

This invention relates to an improved construction in antifriction roller-bearings for shafts, journals, and the like of that class embracing, in connection with the shaft, journal, or other cylindric rotative part, an exterior shell or housing having an annular bearing-surface, rollers interposed between the journal and the shell or housing, and a rotative cage consisting of two connected heads or ends in which the ends of the said rollers are journaled, which is carried by said rollers and by which the said rollers are held constantly in parallel relation during their bodily motion around the bearing-surface.

The invention consists in the matters hereinafter set forth, and defined in the appended claims.

Figure 1:
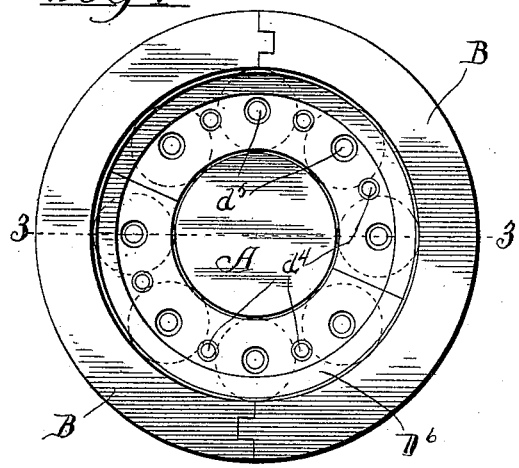
Figure 2:
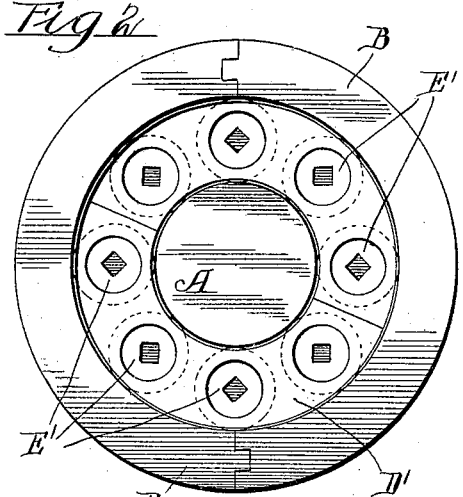

In the accompanying drawings, which illustrate my invention, Figures 1 and 2 are end elevations of a device embodying my invention. Fig. 3 is a section taken on line 3 3 of Fig. 1. Fig. 4 is a section taken on line 4 4 of Fig. 3. Fig. 5 is a longitudinal section of the outer casing or housing. Fig. 6 is an end elevation of the housing, showing the parts thereof separated to better illustrate the construction thereof and means of uniting the same. Fig. 7 is a side elevation of the cage constituting a part of my invention. Fig. 8 is a section on line 8 8 of Fig. 7. Fig. 9 is a view in side elevation of one of the halves of the cage shown in Fig. 7. Fig. 10 is an elevation of a two-part notched bearing-ring, the parts thereof being slightly separated for purposes of illustration. Fig. 11 is a side elevation of the ring shown in Fig. 10. Fig. 12 is an elevation of a ring designed to be rigidly secured at one end of the said cage and to form therewith and with the shell a ball-race. Fig. 13 is a side elevation of the ring shown in Fig. 12. Fig. 14 is a section taken longitudinally through the cage, showing parts broken away. Fig. 15 is a sectional view illustrating a modification of my invention. Fig. 16 is a longitudinal section of a modification of cage constituting a part of my invention. Fig. 17 is a section taken on line 17 17 of Fig. 16. Fig. 18 is a side elevation of the modified cage. Fig. 19 is a section through the fixed cup shown in portion of the head. Fig. 20 is a section, taken on line 20 20 of Fig. 17, similar to that shown in Fig. 19 and illustrating the construction of the bearing at the opposite end of the cage. Fig. 21 is a side elevation of a lock-ring embodied in my invention.

As shown in the drawings, A indicates a cylindrical shaft or journal, and B a two-part stationary shell or housing similar to that shown in my previous application for roller-bearings filed December 27, 1898, Serial No. 700,299, which surrounds the same and is provided with an interior cylindric bearing-surface.

C C indicate antifriction-rollers which are interposed between the shaft A and the inner bearing-surface of the shell B. The said rollers are journaled at their ends in a cage consisting of rings or heads D D' and a plurality of connecting-bars $D^2 D^2$, between which the rollers have bearing contact with the shaft. The central openings in the heads D D' are somewhat larger in diameter than the said shaft, so that they are free from contact therewith, and the external diameter of the said heads is slightly less than the internal diameter of the shell B, in which the said cage is adapted to rotate. Between the ends of the rollers and the heads D D' of the cage are interposed ball-bearings consisting of external bearing members E E', attached to the heads D D', respectively, inner bearing members or cones $c\ c'$, herein shown as having the form of integral projections on the rollers, and bearing-balls G G. Said cage is divided, in a plane passing through the central axis of the same, into two equal and similar parts or sections, each having one-half of the total number of connecting-bars $D^2 D^2$. Each half or section is provided at one end with a semicircular flange $D^3$, arranged in a plane perpendicular to the central axis of the cage and forming one-half of the head D, and at the other end with a similar and similarly-disposed flange $D^4$, forming one-half of the head D'. Each section is provided on one side thereof with a longitudinal radial flange $D^5$, which extends outwardly in the plane of the joint between the two parts of the cage and is united integrally with the edge of one of the said connecting-bars $D^2$ and with the flange $D^3$ at one end of the section. Along the line of junction of the said flange $D^5$ and the connecting-bar $D^2$, to which it is united, is formed a plurality of apertures $d$. The connecting-bar on the side diametrically opposite the said flange $D^5$ is provided on its outer edge with a plurality of projections or teeth $d'$, adapted to be inserted in the apertures $d$ in the flange $D^5$ of the other of said parts when the two parts are united to complete the cage, as illustrated in Figs. 7 and 8.

The head D has an inwardly-directed oblique flange $d^2$ on its rim, and against its outer face is rigidly secured, by riveting or otherwise, a flat ring $D^6$, having on its margin a similar outwardly-directed oblique flange $d^3$, as shown in Fig. 12. The said ring $D^6$ is similar to the said head, and because of its flange being oppositely directed from that of the head and being rigidly united thereto, as shown, provides a V-shaped groove which extends circumferentially around the head and constitutes what is familiarly known as a "ball-race" or the inner annular member of a ball-bearing. The shell B is provided with a V-shaped groove $b$, which corresponds in shape with and is arranged opposite the groove formed on the margin of the head D in the manner described. Said groove $b$ forms the outer annular part of a ball-bearing, in which and the grooves of the head are inserted balls F F. The said ring $D^6$ is also made of stamped metal and constructed in halves to facilitate placing the same about a shaft, each half of the ring being secured to the corresponding half of the cage-head. The parts or sections of the ring $D^6$ are conveniently attached to the flanges of the corresponding cage-sections by means of rivets $d^4$, inserted through said parts and located between the bearing-cups E, which are attached to the cage-head D. The bearing-cups E, which are attached to the said head D of the cage, consist of flanged disks forming cups the outer ends or heads of which are closed, except for central rivet-holes, through which are inserted rivets $d^5$, by which the cups are secured to the flanges $D^3$ of the cage-sections. Said rivets pass through rivet-holes formed in said flanges, and the heads of the rivets rest in holes formed in the ring $D^3$ for their accommodation.

The bearing-cups E' are attached to the head D' of the cage by a screw-threaded connection, affording adjustment of the said cups in the head, said cups being made, like the cups E, in the shape of flanged disks and being inserted in holes in the cage-head, the cups having peripheral screw-threads engaging screw-threads in said holes. In order to provide suitable support for the cups, the flanges $D^4$ of the cage-sections are reinforced by a ring $D^7$, which is made of considerable thickness and consists of two parts or sections, which are attached to the inner faces of the said flanges $D^4$. The parts of the ring $D^7$ are secured to the flange $D^4$ by rivets $d^7$, located between the bearing-cups. Holes $d^8$, screw-threaded to receive the bearing-cups, are formed in both the flange and reinforcing-ring, which together make the head thick enough to properly support and permit the necessary extent of adjustment of the bearing-cups. In order to enable the cups to be easily turned in the head in adjusting the bearings, said cups are provided with centrally-arranged angular apertures adapted to receive a correspondingly-shaped wrench or similar tool, by which the cups may be turned.

In order to facilitate the insertion and removal of the rollers into and from the cage, the ring $D^7$ is provided on its inner face with radial notches extending outwardly from the holes $d^8$ to the outer edge of the ring. Said notches afford passage for the projecting cones $c'$ on the rollers as the adjacent ends of the latter are moved inwardly past the edge of the ring.

The shell or housing B, as shown, is constructed in two equal parts, adapted to be rigidly joined longitudinally, as illustrated in Figs. 5 and 6. As a further improvement the joints between the two parts are formed on spiral lines, and each of the half-shells is provided on one of its lateral edges with a longitudinal tongue and on its other lateral edge with a complemental groove, as shown in Figs. 1, 2, 4, and 6, so that when the two half-shells are united the respective tongues and grooves intermesh and owing to the spiral line of contact lock the parts firmly together. Furthermore, lines of the joints being at all points oblique to the central axes of the rollers insures that they will pass smoothly and without jar over the said joint.

Obviously the cage may be conveniently constructed with the longitudinal bars on the periphery of said cage instead of adjacent to the shaft passing therethrough, as heretofore described, and such a construction is illustrated in Figs. 16, 17, 18, 19, 20, and 21, in which the cage is shown longitudinally divided in the plane of the axis into two similar parts having peripheral longitudinal bars H integral with the heads $h'$ and $h^2$. The radial longitudinal flange H' is integral with a bar H on one side of each of the said parts, which extends inwardly in the plane of the joint between said parts. The said radial flange is integral with the heads at each end and serves to hold the same rigidly in position. Apertures are provided in said flanges in close proximity to the said bars, and the edge of the bar on the opposite side of the said half-shell is provided with projections adapted to interlock with said apertures. The half-rings $h^3$ and $h^4$ in this construction serve the same purpose as do the half-rings $d^3$ and $D^7$ in the construction previously described and are similar thereto and similarly secured upon the heads, except that both half-rings, as shown in Figs. 16, 18, 19, and 20, are secured upon the outer side of the integral ends of the said parts of the cage, and obviously the radial notches shown in the half-rings in Figs. 7, 10, and 11 will be located at the inner margin of the flange. The bearing members are similar to those heretofore described and similarly secured to the heads. The lock-ring I, (shown in Fig. 20,) by the use of which the adjustable bearing members are held in permanent adjustment, have inner faces complemental to the outer end of the said bearing members and are provided with external screw-threads complemental to the screw-threads in the apertures in which the adjustable members are held. The said lock-rings are adapted to be screwed into the outer end of said apertures into jamming engagement with the adjustable bearing members after the same are adjusted in the head.

The making of the cage in two separable parts or sections having interlocking parts or recesses and projections has the important advantage of enabling the cage to be easily applied to a shaft, such as a piece of line-shafting, without the necessity of slipping the cage-heads or any part thereof endwise over the ends of the shaft. Interlocking recesses and projections arranged as described obviously serve to hold the two parts of the cage from endwise movement relatively to each other and to hold the heads of the section in the same plane. Obviously no means is required for rigidly locking together or joining the two sections otherwise than from endwise movement, inasmuch as the rollers being confined by the outer casing or housing can have no movement in a direction to permit lateral separation or shifting of the two parts of the cage.

So far as the main features of the invention are concerned the parts described may be made in any desired manner and of either cast or wrought metal. The main parts of the cage herein shown and particularly described are, however, made of sheet-metal parts stamped or swaged to give them the desired shape, and to these main parts additional parts or pieces are attached to complete the cage. This construction affords a cage possessing the necessary strength and which can be very economically manufactured and is herein claimed as a separate part or feature of my invention.

The ball-bearing formed, as described, between the head D or $h'$ of the cage and the outer shell or casing by the circumferential grooves in said head and the groove in the inner surface of the shell or casing and the balls inserted in said grooves constitute a means of holding the cage and rollers from moving endwise with respect to the shaft and casing. By reason of the casing being divided longitudinally the balls may be inserted in the said grooves without the employment of any separate or removable parts either on the shell or head, and this feature is herein claimed as part of my invention. The formation of the groove on the head by making the latter of two parts having inclined marginal flanges constitutes an improved feature of construction of especial value where the cage is made of sheet metal, and this feature is also herein claimed as part of my invention.

I claim as my invention—

1. A cage for roller-bearings comprising two semicylindric parts or sections divided longitudinally and provided with interlocking projections and recesses on their meeting edges holding said parts of the cage from both endwise and lateral movement.

2. A cage for roller-bearings comprising two parts or sections divided longitudinally; each part or section having end flanges and a longitudinal flange; said longitudinal flanges and the opposite edges of each section having interlocking apertures and projections.

3. A cage for roller-bearings comprising two parts or sections of sheet metal, each having integral connecting-bars and end flanges, and reinforcing half-rings secured to one of said end flanges, said half-ring and end flange to which it is attached being provided with apertures to receive bearing members.

4. A cage for roller-bearings comprising two parts or sections of sheet metal each having integral connecting-bars and end flanges, and half-rings attached to one of said end flanges, said half-rings and the flanges to which they are attached being provided with oblique marginal flanges. forming one gooove of a ball-race.

5. A roller-bearing comprising a divided shell or housing having longitudinal spiral tongue-and-grooved joints, a shaft or journal, and rollers interposed between the shell or housing and the said shaft or journal.

6. A roller-bearing comprising a divided shell or housing having longitudinal spiral joints having an interior cylindric surface, a shaft within said shell, a plurality of rollers interposed between said shell and the shaft, and a longitudinally-divided cage surrounding said shaft.

7. A roller-bearing comprising an outer shell or casing, a shaft or journal within said shell, rollers interposed between the shell and the shaft or journal, a longitudinally-divided cage and ball-bearings for the ends of the rollers comprising external bearing members or cups which at one end of the cage are closed at their outer ends and secured by rivets or the like to the inner face of the cage-head.

8. A roller-bearing comprising a longitudinally-divided outer shell, having a cylindric inner surface provided near one end thereof with an interior bearing-groove, a shaft within said shell, rollers interposed between the shell and the shaft, and a cage for the rollers having in one of its heads a circumferential bearing-groove arranged in opposition to that in the outer shell and bearing-balls inserted in said grooves.

9. A roller-bearing comprising an exterior shell or casing having an interior cylindric surface having near one end a bearing-groove, a shaft or journal within the shell or casing, rollers interposed between the shell or casing and the shaft or journal, and a cage for the said rollers; said cage being divided longitudinally into two parts or sections, each having at its ends flanges and having attached to the flange at one end thereof a half-ring, each half-ring and the flange to which it is attached being provided with inclined marginal flanges which together form a bearing-groove, opposite that in the shell or casing.

10. A roller-bearing comprising a plurality of rollers and a cage therefor, and ball-bearings for the ends of the rollers, said cage having at its ends flat radial heads, and the ball-bearings at one end of the cage having sheet-metal cups which are secured each by a central rivet or the like to the inner face of the cage-head and those at the opposite end of the cage being inserted in and having screw-threaded engagement with apertures in the cage-head.

11. A roller-bearing comprising a plurality of rollers, a cage therefor and ball-bearings for the ends of the rollers, said cage consisting of a sheet-metal part embracing connecting-bars and heads formed by the flanges made integral with the bars, and reinforcing-rings secured to the flange at one end of the cage, the outer bearing members or cups at one end of the cage being inserted in apertures formed in the end flange and reinforcing-ring, and those at the opposite end of the cage having closed outer ends and being secured to the end flange by rivets.

12. A cage for roller-bearings comprising two parts or sections of sheet metal, each having integral peripheral connecting-bars and end flanges.

13. A cage for roller-bearings comprising two parts or sections divided longitudinally, each part or section having end flanges and peripheral longitudinal connecting-bars and a longitudinal flange integral with one of said connecting-bars and said end flanges and lying in the plane of the joint.

14. A cage for roller-bearings comprising two parts or sections divided longitudinally, each part or section having end flanges and longitudinal peripheral connecting-bars, and a longitudinal flange integral with said end flanges and one of said connecting-bars, said longitudinal flange and the opposite edge of each section having interlocking apertures and projections.

In testimony that I claim the foregoing as my invention I affix my signature, in presence of two witnesses, this 12th day of April, A. D. 1899.

AXEL LEVEDAHL.

Witnesses:
WILLIAM L. HALL,
C. W. HILLS.